United States Patent [19]

Hammonds

[11] Patent Number: 5,468,066
[45] Date of Patent: Nov. 21, 1995

[54] APPARATUS AND METHOD FOR INJECTING DRY PARTICULATE MATERIAL IN A FLUID FLOW LINE

[76] Inventor: Carl L. Hammonds, 19114 Cloyanna La., Humble, Tex. 77346

[21] Appl. No.: 323,434

[22] Filed: Oct. 14, 1994

[51] Int. Cl.$^6$ .................................................. B01F 13/06
[52] U.S. Cl. .................. 366/139; 366/155.1; 366/163.1; 366/181.3
[58] Field of Search ................... 366/139, 165.1, 366/165.3, 165.4, 165.5, 177.1, 181.3, 184, 155.1, 163.1; 222/105, 181, 183; 141/65, 330, 67, 114; 220/403

[56] References Cited

U.S. PATENT DOCUMENTS

| | | | |
|---|---|---|---|
| 2,528,514 | 11/1950 | Harvey et al. | 366/165.1 |
| 2,878,969 | 3/1959 | Griswold | 406/132 |
| 3,112,047 | 11/1963 | Weinreich | 222/105 |
| 3,117,695 | 1/1964 | Cox | 222/105 |
| 3,166,096 | 1/1965 | Lang | 137/564.5 |
| 3,456,801 | 7/1969 | Bowles | 210/169 |
| 3,626,972 | 12/1971 | Lorenzen | 137/268 |
| 3,638,833 | 2/1972 | Lucas | 222/57 |
| 3,840,213 | 10/1974 | Kormos | 366/155.1 |
| 4,077,612 | 3/1978 | Ricciardi | 366/165.1 |
| 4,808,004 | 2/1989 | McIntire et al. | 366/155.1 |
| 4,878,320 | 11/1989 | Woodson | 451/39 |
| 4,901,890 | 2/1990 | Mivelaz | 222/395 |

Primary Examiner—Robert W. Jenkins
Attorney, Agent, or Firm—Bush, Moseley, Riddle & Jackson

[57] ABSTRACT

An apparatus and method for injecting dry particulate material into a fluid flow line including a removable material supply unit (18) having an outer rigid container (55) and a sealed flexible bag (54) for the dry particulate material. The removable material supply unit (18) is mounted on a container support (13) above a mixing chamber (12) with a valve member (40) controlling the flow or dispensing of the dry particulate material into the mixing chamber (12). A pump (32) when energized exerts a vacuum in the mixing chamber (12). Water enters the mixing chamber (12) from an elliptical discharge opening (10) tangential to mixing chamber (12) to provide a vortex. Pump (32) exerts a vacuum within the mixing chamber (12) above the level of the water so that any upward migration of moisture from the water in the mixing chamber (12) is prevented by the vacuum when pump (30) is energized. Additional mixing occurs in a dynamic mixing manifold (28) to provide a solution of the dry particulate material within the water for injection of the solution within a pressurized fluid flow line (35) to a suitable facility (S).

25 Claims, 4 Drawing Sheets

FIG. 2
FIG. 4
FIG. 3
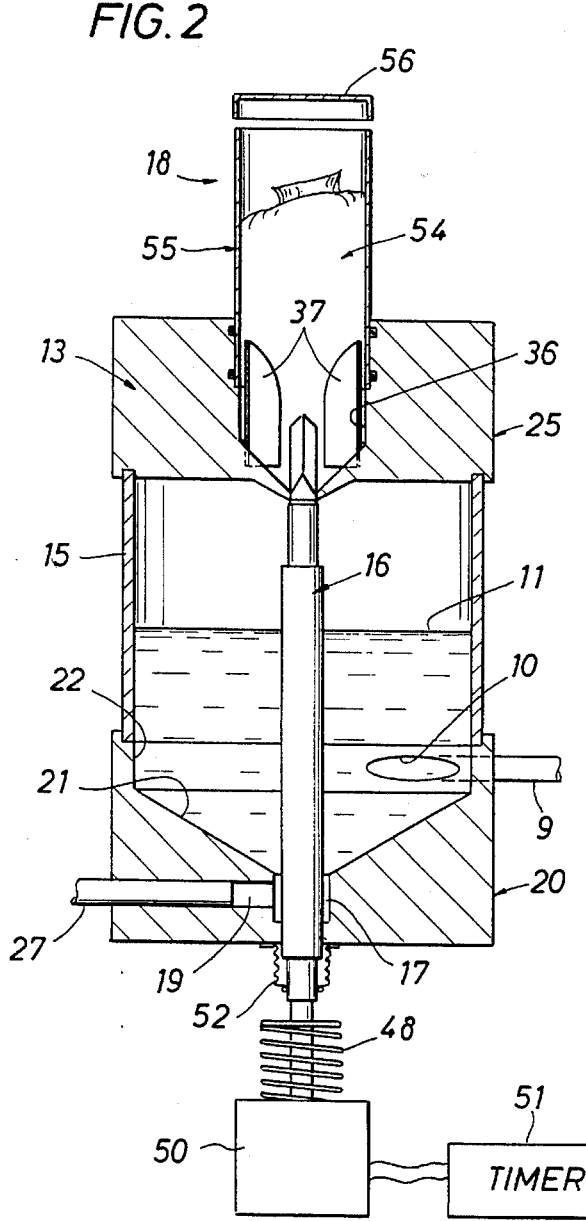
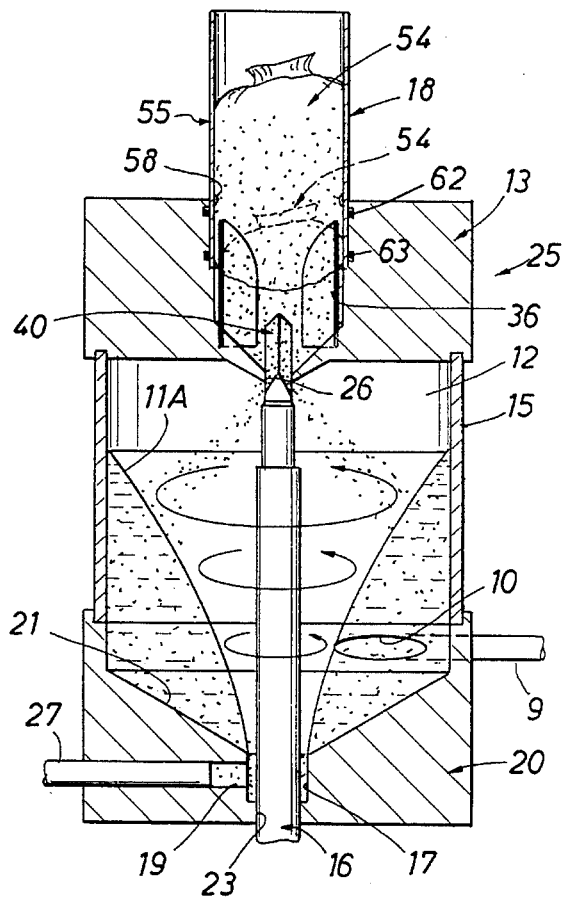
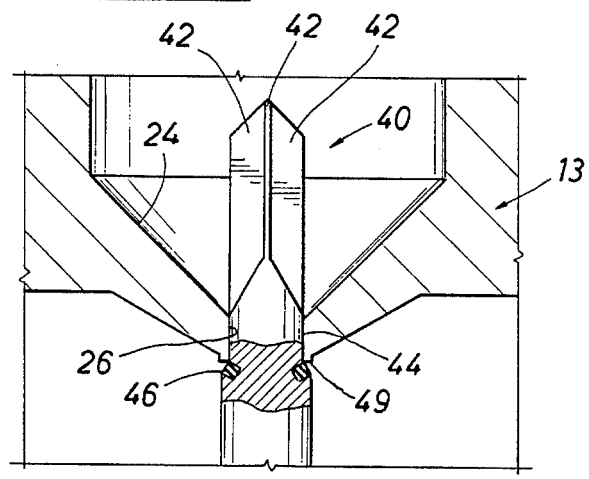

APPARATUS AND METHOD FOR INJECTING DRY PARTICULATE MATERIAL IN A FLUID FLOW LINE

FIELD OF THE INVENTION

This invention relates to an apparatus and method for injecting dry particulate material into a pressurized fluid flow line, and more particularly to such an apparatus and method in which the dry particulate material is first dispensed within a mixing chamber for mixing with the fluid and subsequently injected within the flow line.

DESCRIPTION OF THE PRIOR ART

One of the problems involved with the injection of dry particulate material which includes powdered and granular materials, such as calcium hypochlorite or sodium hypochlorite is in maintaining a dry atmosphere for the dry particulate material when positioned within the injection system as well as storage. This is desired in order to preserve the quality of the dry particulate material as well as to prevent the escape of possibly contaminating fumes and dust residue from the dry particulate material. Thus, exposure to atmosphere of the dry particulate material is not desired.

Another problem involved in the injection of water soluble dry particulate material into a liquid flow line is in providing for the complete mixing of the water soluble particulate material into solution with the carrier liquid prior to injection into the pressurized flow line. It is desirable that none of the undissolved particulate material remain suspended within the carrier liquid.

An injection system for injecting dry particulate material into a pressurized liquid flow line must also provide means for injecting a precisely measured quantity of the dry particulate material into the carrier line. The amount of the injected dry particulate material must be adjustable as desired.

Heretofore, various injection systems have been provided for injecting a dry particulate material into a liquid carder fluid such as water. For example, reference is made to U.S. Pat. No. 3,638,833 dated Feb. 1, 1972 in which an apparatus is provided for chlorinating a swimming pool. A container for the water soluble chlorine powder has a thin plastic cover for the discharge opening which is cut upon mounting of the container onto the injection apparatus. The chlorine powder flows by gravity from the container into a measuring chamber where it flows downward into a mixing chamber with water. The mixed chlorine powder and water are discharged by gravity from the mixing chamber.

U.S. Pat. No. 3,456,801 dated Jul. 22, 1969 also shows an apparatus for feeding dry particulate material into a swimming pool in which the chlorine powder is fed by a screw feeder into a mixing chamber in which the level of water is controlled by a float. The water is discharged into the mixing chamber from an inlet in the bottom of the mixing chamber for agitation of the water in the mixing chamber to minimize any settling of insoluble solids when the dry particulate material, such as calcium hypochlorite is mixed with the water.

U.S. Pat. No. 4,878,320 dated Nov. 7, 1989, is directed to an abrasive blast cleaning system that utilizes a pressure differential for the metering of a dry particulate material into an air flow line. A discharge nozzle is connected to the air flow line and water is mixed with the air entrained particulate material at the nozzle for discharge against a surface to be cleaned.

SUMMARY OF THE INVENTION

The present invention is directed particularly to an apparatus and method for injecting a dry particulate material in a pressurized fluid flow line. The dry particulate material may be a powdered material or a granular material and preferably but not necessarily water soluble. The fluid flow line can be open to atmosphere or a pressurized liquid line. The dry particulate material is mixed with a liquid, usually water, and normally forms a solution that is injected in the pressurized flow line. The dry particulate material is sealed within an airtight container which is impervious to moisture. The container which is formed of a generally rigid material has an inner flexible liner in contact with the dry particulate material. The flexible liner is responsive to a vacuum upon the feeding of the particulate material from the container and generally follows a conduit of dry particulate material during unloading from the container. The container seal is punctured when the container is installed within the apparatus for a controlled feeding of the dry particulate material into a mixing chamber with water positioned below the container.

The bottom of the mixing chamber receives a continuous flow of fluid. Fluid enters the chamber tangent to the outer wall and exits circumferentially around the center poppet support tube creating a vortex. The fluid vortex evenly dispenses the dry granules throughout a given volume of fluid as it passes through the chamber. Vacuum exerted by the flowing stream of water across the bottom of the mixing chamber provides a barrier to the upward migration of any moisture into the dry particulate material with the container. Also, the vacuum exerted in the upper portion of the mixing chamber draws the dry particulate material downward into the fast flowing stream of the liquid. A supply of water flowing across the mixing chamber is restricted by a metering valve having an orifice therein of a predetermined size for the desired amount of flow and vacuum. After the dry particulate material is drawn into the moving flow stream at the bottom of the mixing chamber, the mixture of the liquid and particulate material is mixed further within a dynamic mixing chamber which consists of a series of coiled tubing and baffles to provide complete blending of the granulated material into solution. For water soluble particulate material, a solution is obtained with a minimum of any suspended particles. The mixing chamber is constructed and arranged to provide an adequate volume of liquid in the bottom of the mixing chamber to accomplish complete wetting of the particulate material in the liquid prior to entering the dynamic mixing chamber. The particulate material is typically dissolved before entering the pump for discharge into the pressurized main flow line in which the mixture is injected.

The present invention would have various applications such as for use with home and commercial swimming pools, residential and public water wells, waste water systems, sprinkler systems, agricultural irrigation systems, sprinkler systems that deliver granulated fertilizers, pesticides and herbicides and water softening agents, as examples. It is desirable for practically all powders or granulated materials to be free of moisture as most powders and granulated materials are moisture sensitive. Atmospheric moisture and other airborne contaminants may contaminate the dry particulate material and the present invention provides a sealed system in which the dry particulate material is protected from moisture even after the sealed container is opened and while flowing into a moving liquid stream for mixing therewith. A vacuum is continuously exerted in the mixing chamber when a valve member for dispensing the dry particulate material is in an open position thereby preventing migration of any moisture from the flowing stream of water at the bottom of the mixing chamber into the dry particulate material in the container. In various other injection systems utilizing only gravity to propel the granulated material from the storage area to the liquid flow, an upward migration of moisture usually occurs to contaminate the dry particulate material in the container and clog the orifice where the dry particulate material exits the storage container, thus rendering the system inoperable. The present invention eliminates this problem.

It is an object of the present invention to provide an apparatus for injecting dry particulate material into a pressurized fluid flow line while preventing the upward migration of moisture from the liquid flow line into a container for the dry particulate material being fed or dispensed into the flow line.

A further object of the present invention is to provide such a system and apparatus in which a vacuum is continuously exerted in the mixing chamber in which the dry particulate material is dispensed for drawing the dry particulate material from the dispensing device in an open position downward into the liquid flow line while preventing any upward migration of moisture from the liquid in the mixing chamber.

An additional object of the invention is to provide a container or dispenser for the dry particulate material which as the dry particulate material sealed in a membrane in the container with the membrane collapsing upon dispensing for the dry particulate material into the mixing chamber, thus eliminating contamination of the environment and contact with humans of potentially dangerous chemicals.

Other objects, features, and advantages of the invention will become more apparent after referring to the following specifications and drawings.

BRIEF DESCRIPTION OF THE DRAWINGS

FIG. 2 is an enlarged section, partly schematic, of the means for dispensing the dry particulate material from a flexible bag in a hopper into a mixing chamber below the bag;

FIG. 3 is an enlarged sectional view of the dispensing means for metering the dry particulate material from the refillable hopper into the lower mixing chamber;

FIG. 4 illustrates the dispensing means of FIG. 2 in an operable position with water entering the mixing chamber in a tangential relation and creating a vortex for effecting mixing of the water and particulate material;

DESCRIPTION OF THE INVENTION

Figure 1:
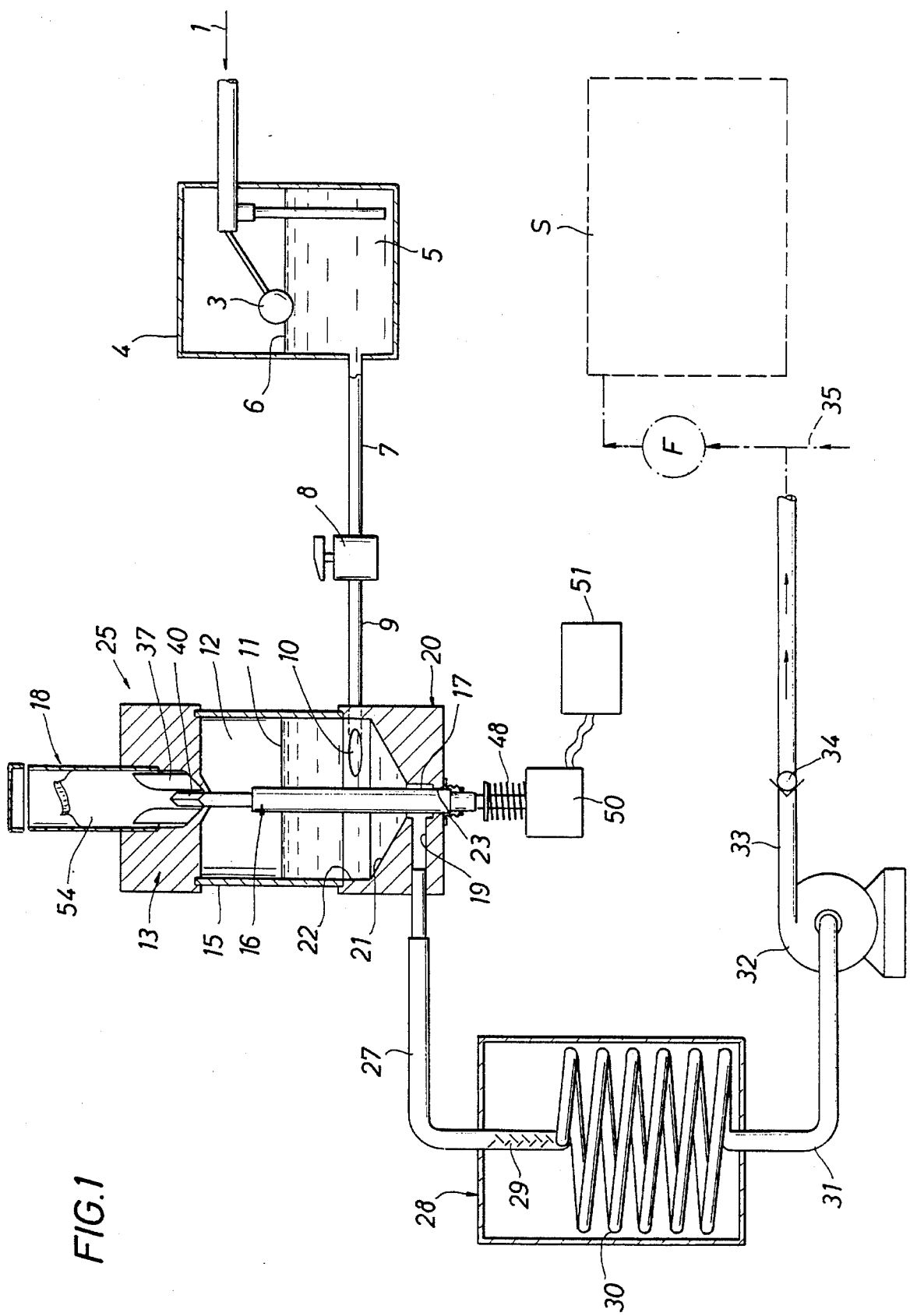
FIG. 1 is a generally schematic view of the system of the present invention for injecting a dry particulate material in a fluid flow line.

Referring now particularly to FIG. 1, a system for injecting a dry particulate material into a pressurized fluid is illustrated schematically for a water treatment facility or plant in which a dry particulate chlorinating agent such as calcium hypochlorite is injected into a pressurized water line leading to the water treatment facility. While a water treatment facility is illustrated as an example of an application of the present invention, it is to be understood that the present invention has various other uses, such as swimming pools, various water supply systems, waste water systems, and sprinkler systems injecting fertilizers and pesticides as well as food processing injecting various granulated materials. Also, while water is illustrated as the carrier fluid for mixing with the dry particulate material, other liquids may be utilized with the present system, such as food processing syrups, milk and fuels.

A water tank or reservoir shown at 4 is supplied with water from a suitable source by pipe 1. A float 3 connected to pipe 1 stops the flow of water into tank 4 when the water shown at 5 reaches a predetermined level shown 6 as well known. Water is supplied from tank 4 through line 7 to a metering valve generally indicated at 8 and having an adjustable orifice therein to restrict or control the supply of water from metering valve 8 through inlet line 9 to a mixing chamber generally indicated at 12. Inlet line 9 has an elliptical outlet opening 10 which is directed tangentially to the inner circumference of mixing chamber 12 to provide a swirling action as the water enters chamber 12 for creating a vortex. An outlet line 27 leads from mixing chamber 12 to a dynamic mixing manifold 28 comprised of coiled tubing 30 and mixing baffles 29 in which the water and water soluble dry particulate material is completely mixed to form a solution for discharge into pressurized line 35. Pressurized line 35 has a filter F and leads to a facility such as a water treatment plant S at which it is desired to add or inject the solution containing the dissolved particulate material. A pump 32 is connected by line 31 to dynamic mixing chamber 28. A line check valve 34 in delivery line 33 to line 35 prevents fluid from entering the system from the pressurized line 35.

Pump 32 may comprise a positive displacement diaphragm pump or other positive displacement pump for a relatively small system, while a larger system may utilize a high volume centrifugal pump. It should be noted that in the event the present invention is utilized with a swimming pool, a separate external pump is not required for operation. The system may be installed on the suction side of an existing recirculating pump for the swimming pool, thereby eliminating the need for a separate pump. Thus, the vacuum exerted by a particular system may vary depending on the type of pump and volumetric capacity of the various system components.

Inlet line 9 and outlet line 27 connected to mixing chamber 12 are arranged so as to create a vortex as fluid enters and exits the chamber. A base 20 for mixing chamber 12 has a lower frusto-conical inner surface 21 and an upper cylindrical surface 22. The elliptical outlet opening 10 from inlet line 9 enters base 20 in a tangential direction relative to the inner cylindrical surface 22 of base 20 above frusto-conical inner surface 21. An outlet port 19 in base 20 below frusto-conical surface 21 leads to outlet line 27. A bottom opening 23 in base 20 receives a vertically movable valve control rod or stem 16. An annulus 17 is formed about stem 16 adjacent port 19. A transparent cylindrical sleeve 15 is supported on base 20 for defining mixing chamber 12 along with base 20.

For providing a supply of dry particulate material for mixing chamber 12, a separate transportable material supply unit 18 has an inner flexible bag 54 of dry particulate material positioned within an outer rigid container 55. Material supply unit 18 is removably mounted on dispensing device 25. The dry particulate material from bag 54 flows into a hopper defined by dispensing device 25 and is metered or dispensed form dispensing device 25 into mixing chamber 12 as will be explained further below. FIGS. 1 and 2 show the apparatus in an inoperable position while FIGS. 4 and 5 show the apparatus in an operable position with dry particulate material being metered into mixing chamber 12. A vacuum is continuously exerted by pump 32 within mixing chamber 12 while the dry particulate material is being dispensed or fed from bag 54 into the mixing chamber 12. The continuous exertion of a vacuum within mixing chamber 12 while the dry particulate material is being dispensed as shown in FIG. 4 prevents the migration of moisture from the surface 11A of the swirling water in mixing chamber 12 into the particulate material within the supply unit 18. A rate of water flow sufficient to create a vortex, such as five (5) gallons per minute, and a vacuum two (2) and four (4) inches of water column has been found to be satisfactory for the dispensing of calcium hypochlofite into a mixing chamber having a diameter of eight (8) inches, for example. The fluid level in mixing chamber 12 when the system is in operation is determined primarily by the velocity of liquid being drawn through the system. As the velocity or volume of water increases in mixing chamber 12, the resulting vortex generated forces water to rise higher on the outer interior walls of the vacuum mixing chamber 12.

Referring to FIG. 2, an enlarged view of material supply unit 18 and mixing chamber 12 is shown in an inoperable position in which dispensing device 25 is positioned between mixing chamber 12 and supply unit 18 for controlling the flow of particulate material from supply unit 18 to mixing chamber 12. Dispensing device 25 includes a container support or receptacle generally indicated at 13 which supports supply unit 18 for the particulate material being dispensed. Container support 13 includes a generally cylindrical housing supported on the upper end of cylindrical sleeve 15 and having a central bore 14 which defines a hopper to receive the dry particulate material from flexible bag 54. Central bore 14 is defined by a lower frusto-conical surface 24 and a reduced diameter lower bore portion forming a lower discharge opening 26 for the particulate material. An enlarged upper bore portion 36 above frusto-conical surface 24 is defined by central bore 14. A pair of arcuate piercing blades or knives 37 are secured to lower surface 24 and extend vertically therefrom. Knives 37 have sharp outer edges 38 thereon which converge at an upper apex 39.

Valve control rod or stem 16 controls the flow of particulate material from lower discharge opening 26 and has a valve member or poppet generally designated at 40 on its upper end. Poppet 40 has a fluted end defining four grooves between partitions 42 for the downward passage of particulate material through the grooves in a lowered retracted position of poppet 40 as shown in FIG. 5. The grooves terminate at a reduced diameter portion 44 of stem 16 and an elastomeric annular seal 46 extends about reduced diameter stem portion 44. Annular seal 46 seats against a lower annular seat or shoulder 49 on housing 13 about lower discharge opening 26 in the raised closed positions of poppet 40.

The four partitions 42 or un-routed portions of poppet 40 are the same diameter as reduced diameter stem portion 44 to provide alignment for stem 16 and poppet 40 as poppet 40 moves up and down within lower discharge opening 26. Seal 46 in the closed projected position of poppet 40 shown in FIG. 3 is spaced vertically from the fluted grooves of poppet 40 by the length of reduced diameter stem portion 44. Upon the upward movement of poppet 40 from the lower retracted position as shown in FIG. 4, flow of particulate material through discharge opening 26 stops when the upper end of reduced diameter stem portion 44 reaches seat 49 prior to contact of seal 46 with seat 49. This stoppage of flow prior to seal contact greatly reduces any accumulation of granulated material between seal 46 and seat 49.

A spring 48 continuously urges poppet stem 16 and poppet 40 to a seated closed position within lower discharge opening 26 as shown in FIGS. 2 and 3. A bellows type seal 52 is mounted about poppet stem 16 to provide a seal for bottom opening 23 to prevent leakage from atmosphere to chamber 12. An electromagnet is shown at 50 connected to poppet stem 16 for opening of poppet 40. An adjustable timer 51 is connected to electromagnet 50 to permit energizing of electromagnet 50 at predetermined time intervals for opening and closing of poppet 40 for the desired flow of dry particulate material from container 18. Spring 48 acting against electromagnet 50 continuously urges poppet 40 to a closed position relative to lower discharge opening 26. Although an electromagnet 50 is used in this illustration as a means to operate poppet stem 16, other means may be employed such as an pneumatic cylinder or electromechanical lever, for example.

As shown in FIG. 1, the water level 11 of the water in mixing chamber 12 is shown at the level 6 of the water within tank 4 when pump 32 is inoperable and a vacuum is not being exerted within chamber 12. When pump 32 is energized, a vacuum is exerted from pump 32 through line 27 to mixing chamber 12 and water is discharged from outlet line 33 to permit flow of water within chamber 12 from opening 10. Upon the exertion of a vacuum in chamber 12, water within chamber 12 is lowered an amount dependent on the water velocity and amount of vacuum, and a swirling action is created from the tangential flow of water from opening 10. Arrows shown in FIG. 4 indicate the fluid vortex generated within chamber 12 as a result of the tangential entrance of liquid at inlet opening 10 in combination with the lower frusto-conical surface 21 of mixing chamber 12. The fluid vortex aids in rinsing the internal surface of mixing chamber 12 as well as providing an even distribution of the particulate material into the liquid as it passes through mixing chamber 12. Upon de-energizing of pump 32, the water level in mixing chamber 12 returns to the same level as tank 4 as indicated in FIG. 1.

Referring particularly to FIG. 4, the metering and injecting of the particulate material into mixing chamber 12 is illustrated with the particulate material being dispensed into the swirling fluid vortex. With poppet 40 in a lowered open position, the particulate material passes through discharge opening 26 into chamber 12 where it enters a swirling fluid vortex and is gradually carried down and out of chamber 12 by outlet port 19 and outlet line 27 into dynamic mixing chamber 28. The particulate material is gradually dissolved or reduced to a complete solution in mixing chamber 28 before entering pump 32 for delivery to pressurized line 35 which forms a treated solution line to water treatment plant S as shown in FIG. 1. When pump 32 is energized, a continuous vacuum is exerted within chamber 12. Cylindrical sleeve 15 is formed of a transparent or translucent material to provide for visual observation of the injection process. Other means for observing the process could include an observation port with a translucent window, for example. The provision to observe the injection process may be helpful, but is not necessary to the operation of the system.

Figure 5:
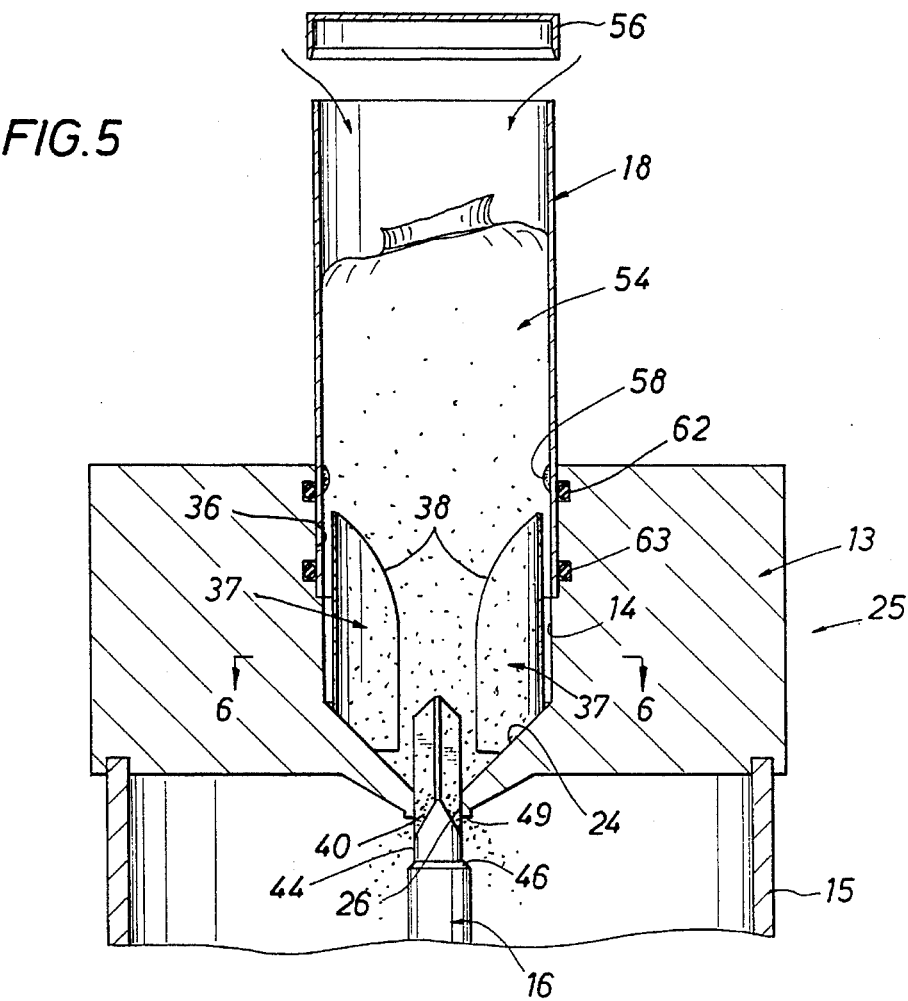
FIG. 5 is a sectional view of the metering means with the valve means shown in an open position to permit flow of dry particulate material into the mixing chamber.
Figure 6:
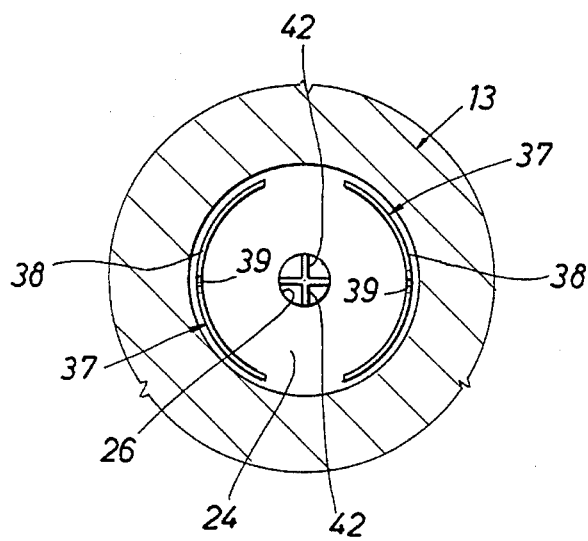
FIG. 6 is a section taken generally along line 6–6 of FIG. 5.
Figure 7:
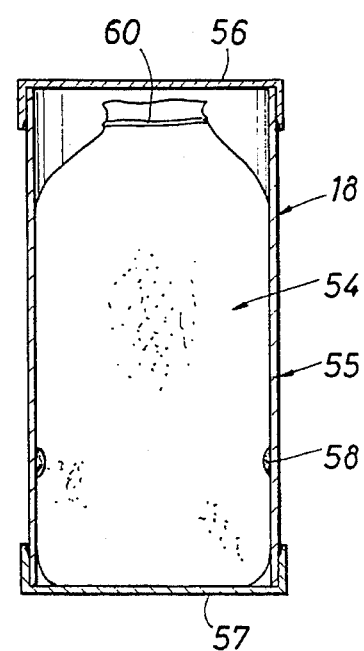
FIG. 7 is a sectional view of a transportable container having a flexible bag therein filled with dry particulate material and adapted to fit within a hopper of the dispensing apparatus.

The particulate material prior to dispensing should be in a sealed container so that contamination, particularly from moisture, is prevented. For this purpose the particulate material may be stored initially in a sealed plastic bag 54 formed, for example, of polyethylene having an optimum thickness between two (2) to five (5) inches. The open end of bag 54 is heat sealed after being filled with the particulate material. It is desirable that flexible bag 54 be positioned within the generally rigid container 55 prior to filling. Rigid container 55 has a generally cylindrical body with a removable upper lid or cover 56 and a removable bottom cover 57. A circular band of adhesive 58 is applied to the inner peripheral surface of container 55 and an air tight seal is formed between bag 54 and the band of adhesive 58 when bag 54 is filled with particulate material after being positioned within container 55 with upper cover 56 removed. Bag 54 is first positioned within container 55 and then filled with particulate material. The upper end of bag 54 is then heat sealed at 60 with the adhesive from circular adhesive band 58 engaging the outer periphery of bag 54 in a sealing relation. The material supply unit 18 including container 55 with filled bag 54 as shown in FIG. 5 may be easily transported to the material dispensing device 25 for insertion. As an example of a container 55 and bag 54 which has been found to be satisfactory for calcium hypochlorite or sodium hypochlorite, a polyethylene bag having a thickness of five (5) mils is placed within container 55 which may be formed of a polyvinylchloride (PVC) material having a non-porous surface. Container 55 may, for example, have a diameter of eight (8) inches with bag 54 being filled with the particulate material at a weight of around twenty five (25) pounds. The upper end of bag 54 is then heat sealed. Circular adhesive band 58 provides a continuous circular air tight seal between bag 54 and container 18.

Prior to insertion of container 55 and filled bag 54 within container support 13, bottom cover 57 is removed from container 55 exposing bag 54. Surface friction between bag 54 and the inner peripheral surface of container 55, in combination with adhesive band 58 adheres bag 54 to container 55 for maintaining an air tight seal between bag 54 and container 55. When container 55 and bag 54 are inserted into enlarged diameter bore 36 which forms a hopper for container support 13 as shown in FIG. 4, the smooth exterior surface of container 55 first contacts an upper annular seal 62. As container 55 moves further downwardly, seal 63 is engaged by container 55 and the exposed bottom of bag 54 is pierced by edges 38 of piercing knives 37 allowing the particulate material to flow from bag 54 down into the hopper and a holding area defined by frusto-conical surface 24 above poppet 40. The additional capacity from the holding area allows an installed material supply unit 18 to be removed, and a new material supply unit 18 to be installed before the system has completely exhausted the supply of particulate material remaining from the previous material supply unit 18.

When container 55 is pressed downwardly to its maximum depth against a shoulder in bore 36, the second lower external seal 63 further assures the air tight seal between container 18 and upper container support 13. As bag 54 is evacuated, the empty portion of bag 54 collapses as shown in broken lines in FIG. 4 towards the bottom of the container under the influence of the vacuum from chamber 12, as air leakage from atmosphere past upper cover 56 urges bag 54 against its contents. When it is desired to replace an emptied or partially emptied bag 54, upper cover 56 of the used container 55 is removed to permit visual inspection of the level of particulate material within container 18.

Since seals 62, 63 seal the exterior of material supply unit 18, and the circular adhesive band 58 seals the bag 54 against the inner surface of cylindrical body 55, the contents of bag 54 are effectively isolated from the environment even though bag 54 has been punctured by knives 37. Since the interior of bag 54 is exposed to the vacuum from chamber 12 in the open position of poppet 40, the upper portion of bag 54 exposed to atmosphere follows the level of particulate material remaining in bag 54 until the contents of bag 54 are completely emptied.

Figure 8:
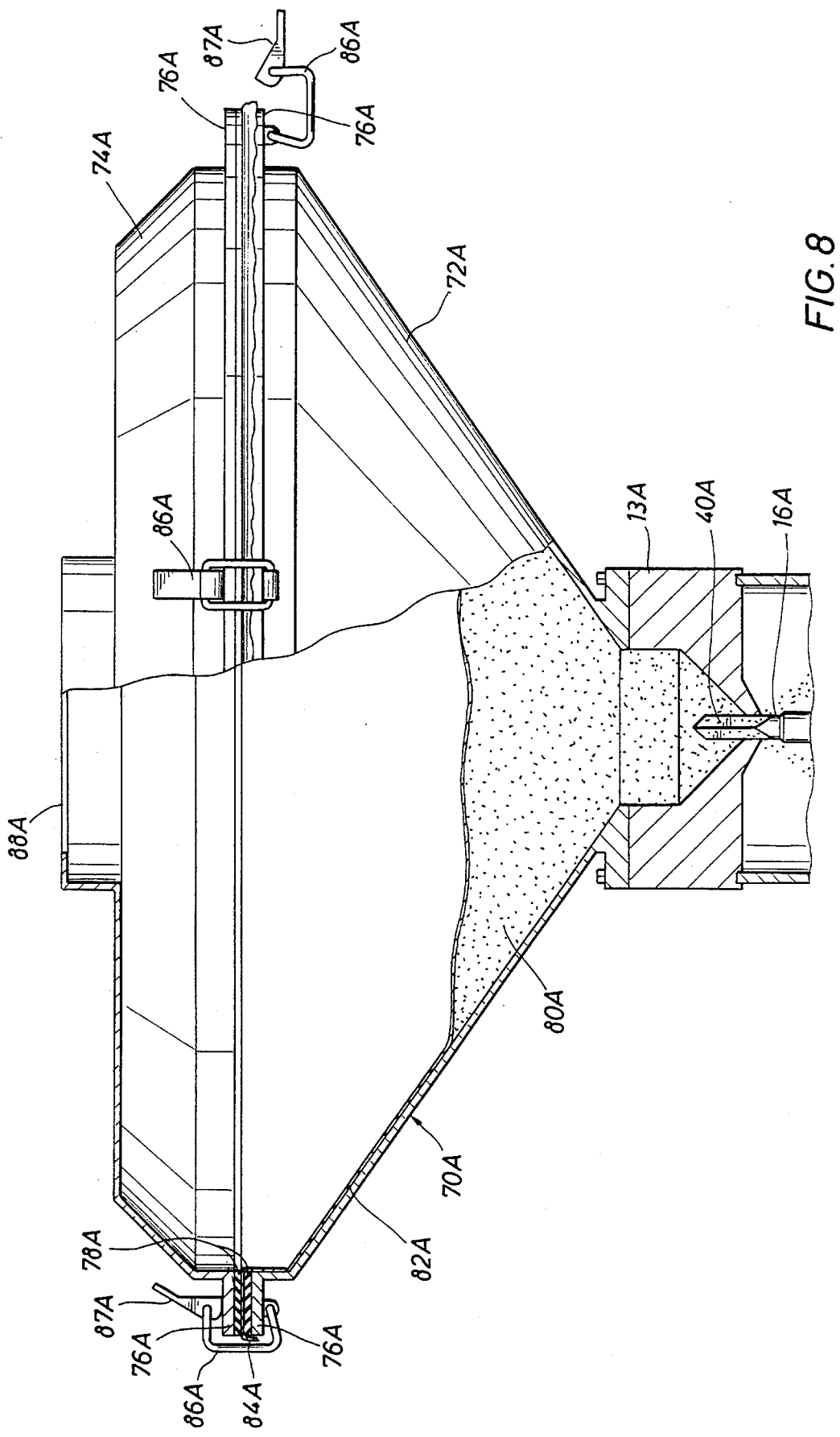
FIG. 8 is a sectional view of a modified dispensing means and supply means for the dry particulate material in which a hopper is fixed to a lower support and the dry particulate material is supplied directly to the hopper.

Referring now to FIG. 8, a modification of the present invention is illustrated in which a hopper generally indicated at 70A is mounted on hopper support 13A and has a body 72A with an upper removable cover or lid 74A. Body 72A and cover 74A have mating flanges 76A which have elastomeric seals 78A thereon. To fill hopper 70A with dry particulate material, cover 74A is removed and the dry particulate material shown at 80A fills hopper 70A up to flanges 76A. Then, a flexible plastic cover shown at 82A is positioned over the particulate material with a marginal portion 84A of cover 82A positioned over lower flange 76A. Cover 74A is then positioned over body 72A with mating flanges 76A contacting flexible cover 82A. Next, swing brackets 76A pivotally mounted on body 72A are swung over flanges 76A and toggle handles 87A are actuated for clamping flanges 76A in air tight relation against flexible cover 82A. Upon metering or feeding of the dry particulate material into the mixing chamber upon actuation of poppet stem 16A and poppet 40A a vacuum is exerted against the particulate material within hopper 70A and flexible cover 82A follows the upper contour of the particulate material as the contents are unloaded from hopper 70A. As the inner surface of flexible cover 82A is sealed from atmosphere by elastomeric seals 78A, atmospheric pressure on the outer surface of flexible cover 82A urges cover 82A downwardly into contact with the upper surface of dry particulate material 80A. An opening 88A in cover 74A provides a vent to atmosphere. Flexible cover 82A may be formed of polyethylene, for example. The remainder of the apparatus (not shown) is similar to the apparatus shown in FIGS. 1-7. Thus, in the embodiment of FIG. 8, a separate transportable container for the dry particulate material is eliminated, which may be desirable under certain conditions of use. It is apparent that other various means for supplying the dry particulate material to the dispensing means may be provided within the scope of the present invention.

The amount of granulated material to be mixed with water for injecting into the main flow line, such as pressurized line 35, is predetermined, and this amount may be varied by selected adjustment of both the duration and frequency of the opening and closing cycles of the fluted poppet 40 by timer 51. The flow rate of water passing through the system remains constant but the volume of particulate material is varied thus regulating or controlling the concentration of additive or particulate material in the solution.

Referring to FIG. 1, the height of water level 11 in mixing chamber 12 in the inoperable position of the apparatus is determined by the position of the adjustable float 3 in water tank 4. A substantial distance such as at least four (4) inches is provided between the water level 11 in mixing chamber 12 and the air tight seal 46 provided by poppet 40 in the closed position of poppet 40. This distance in combination with seal 46 prevents migration of moisture past seal 46 and into the particulate material above opening 26 when the system is not operating. When in operation, the vacuum exerted by pump 32 within container 12 draws the water level downwardly and prevents migration of moisture from water surface 11A past lower discharge opening 26.

The mixing of particulate material into solution is only partially completed within mixing chamber 12. The primary purpose of mixing chamber 12 is to entrain the particulate material into the flowing solution stream. As the partially dissolved solution leaves mixing chamber 12 and enters dynamic mixing chamber 28, the solution passes through a series of baffles 29 and coiled tubing 30 where mixing is completed prior to entering pump 32. Pump 32 then pushes the mixed solution into delivery line 33, passing through an in-line check valve 34 prior to entering the flowing product stream 35 that is to be treated. Depending on the solubility of the particulate or granulated material, additional dynamic mixing chambers similar to chamber 28 for example, can be added on the discharge side of pump 32 in order to effect complete mixing of the particulate material into solution.

While pressurized line 35 is illustrated in FIG. 1 as leading to a water treatment plant for injection of calcium hypochlorite, it is apparent that pressurized line 35 which normally includes a predetermined particulate material in solution with water, could also be connected, for example, to a swimming pool, irrigation system, a cooling tower treatment facility, or a waste water treatment facility.

While the present invention is particularly adapted for utilization with water soluble dry particulate material, it is to be understood that the present invention may be utilized with dry particulate material which is not water soluble or only partially water soluble, such as various fertilizers, pesticides, or herbicides, which may be injected into various sprinkler systems such as golf course greens or any sprinkler or liquid delivery system that would have application for granulated fertilizers, pesticides, or herbicides. It is apparent that various types of valving means can be provided to control the flow of dry particulate material into the mixing chamber. The present invention includes a dispensing means which has been found to function satisfactorily.

Since certain changes or modifications may be made in the disclosed embodiment without departing from the inventive concepts involved, it is the aim of the appended claims to cover all such changes and modifications falling within the true spirit and scope of the present invention.

What is claimed is:

1. Apparatus for injecting a dry particulate material into a pressurized fluid flow line comprising:
    a mixing chamber for mixing the dry particulate material with liquid;
    a liquid supply having an inlet line communicating with said mixing chamber to supply pressurized liquid thereto;
    material supply means over said mixing chamber for selectively supplying dry particulate material to said mixing chamber for mixing with liquid supplied by said inlet line;
    an outlet line from said mixing chamber in fluid communication with liquid having the dry particulate material therein; and
    pump means in said outlet line for exerting a vacuum in said mixing chamber and said fluid flow line upstream of said pump, said pump injecting mixed liquid and particulate material from said mixing chamber within said pressurized fluid flow line.

2. Apparatus as set forth in claim 1 wherein:
    said material supply means comprises a removable material supply unit including an outer rigid container and an inner flexible bag for the dry particulate material; and
    dispensing means for said removable material supply unit positioned above said mixing chamber and movable between open and closed positions to permit selectively the supply of dry particulate material from said flexible bag into said mixing chamber.

3. Apparatus as set forth in claim 2 wherein said flexible bag and dry particulate material therein is responsive to a vacuum upon opening of said dispensing means, said flexible bag contacting and generally following the upper contour of the dry particulate material therein during unloading of the dry particulate material from the bag.

4. Apparatus as set forth in claim 3 wherein:
    said flexible bag is impervious to moisture and an air tight seal is provided between said flexible bag and said rigid container comprising a circular band of adhesive extending between the inner surface of said rigid container and the adjacent outer surface of said bag to provide an air tight connection therebetween.

5. Apparatus as set forth in claim 2 wherein container support means are provided adjacent the upper end of said mixing chamber to support said removable material supply unit thereon for unloading of dry particulate material from said bag for flow into said mixing chamber; and
    opening means for said bag are mounted on said container support means for opening of said bag to permit the particulate material to be emptied from said bag.

6. Apparatus as set forth in claim 1 wherein:
    said material supply means comprises a hopper over said mixing chamber having a body and an upper removable lid over the body with bulk dry particulate material being placed within said body;
    a flexible cover positioned between said lid and said body over said dry particulate material; and
    means on said body and said lid for sealing said flexible cover therebetween so that said flexible cover follows the upper contour of the dry particulate material as the material is dispensed from said hopper upon the exertion of a vacuum within the mixing chamber.

7. Apparatus as set forth in claim 1 wherein:
    said liquid supply comprises a tank having a predetermined liquid level therein; and
    means maintain the liquid in said mixing chamber at the same level as the liquid in said tank when said apparatus is inoperable.

8. In apparatus for mixing a liquid soluble dry particulate material with liquid for injection into a main fluid flow line including a liquid supply, a liquid line extending from said liquid supply to said main fluid flow line, a mixing chamber in said liquid line, and a pump in said liquid line downstream of said mixing chamber for exerting a vacuum upstream of said pump and for pumping a mixture of water and water soluble dry material into said main fluid flow line; the improvement comprising means for supplying and metering the dry particulate material into the liquid line upstream of said pump; said means including:
    a generally rigid container having a lower discharge opening in fluid communication with said mixing chamber;
    a sealed flexible bag within said container having a supply of dry particulate material therein and providing dry particulate material to said lower discharge opening; and a closure at said lower discharge opening movable selectively between open and closed positions with a vacuum exerted at said lower discharge opening from said pump upon opening of said closure thereby to assist in the flow of dry particulate material into said mixing chamber and thence into said liquid line.

9. In apparatus as set forth in claim 8;

said mixing chamber being positioned between said lower discharge opening and said liquid line and having a supply of liquid therein from said liquid line, the dry particulate material from said lower discharge opening being discharged into said mixing chamber and mixing with liquid therein before entry into said liquid line from said mixing chamber.

10. In apparatus as set forth in claim 8;

a circular air tight seal between said flexible bag and said container;

said flexible bag upon emptying of the dry particulate material into said mixing chamber following the contour of the dry particulate material, said pump when energized exerting a vacuum within said mixing chamber to prevent migration of moisture past said lower discharge opening.

11. In apparatus as set forth in claim 8;

a fixed container support above said mixing chamber having a bore therein defining a hopper for receiving said container and flexible bag; said container and bag removably fitting within said bore; and means breaking said sealed bag upon positioning within said fixed container support adjacent said lower discharge opening for emptying of the contents of said bag into said mixing chamber; said emptied flexible bag being replaced with a filled flexible bag after being emptied.

12. In apparatus as set forth in claim 11;

said container and said flexible bag defining a replacement material supply unit in which a sealed supply of dry particulate material is contained within said bag, said replacement material supply unit being removably connected to said container support; and means to break said flexible bag when said replacement material supply unit is removably mounted to said container support to permit the flow of dry particulate material therefrom.

13. In apparatus as set forth in claim 12;

said fixed container support having a lower discharge opening adjacent the upper end of said mixing chamber;

a valve member within said discharge opening; and control means for selectively moving said valve member between open and closed positions relative to said lower discharge opening.

14. Apparatus as set forth in claim 13;

said control means including means for opening said valve for a predetermined time period.

15. Apparatus as set forth in claim 14;

said control means including an electromagnet selectively energized for moving said valve to an open position for a predetermined time period.

16. A replaceable material supply unit of dry particulate material for detachable connection to a container support for metering the particulate material into a mixing chamber for mixing with liquid; said replaceable material supply unit comprising:

a generally rigid outer container having a tubular body with an upper cover and a lower cover;

a flexible air tight bag having dry particulate material therein positioned within said tubular body and restrained thereby; and an air tight seal between the outer surface of said flexible bag and the inner surface of said tubular body extending about the outer periphery of said flexible bag.

17. The replaceable supply unit as set forth in claim 16 wherein:

said rigid outer container having a cylindrical tubular body; and said air tight seal comprises a circular band about the inner surface of said body.

18. The replaceable supply unit as set forth in claim 17 wherein said air tight seal comprises a circular band of adhesive, and said upper and lower covers are removable from said cylindrical body.

19. Apparatus for dispensing a supply of dry particulate material into a mixing chamber containing liquid and having means exerting a vacuum within the mixing chamber when energized; said apparatus comprising:

a container support above the mixing chamber having a central bore therein defining a hopper having a lower discharge opening for the metered discharge of dry particulate material within said mixing chamber;

material supply means removably mounted within said central bore for selectively supplying dry particulate material to said mixing chamber for mixing with liquid within said mixing chamber; said material supply means including a generally rigid outer container and an inner flexible bag within said container having a supply of dry particulate material therein; and an air tight seal between the inner surface of said outer container and the adjacent outer surface of said flexible bag whereby, upon the dispensing of particulate material from said bag into said mixing chamber through said lower discharge opening, a vacuum is exerted against said bag from said mixing chamber so that the contour of said bag follows the contour of the particulate material within the bag as the bag is being emptied of particulate material.

20. Apparatus as set forth in claim 19:

a liquid inlet line to said mixing chamber;

a liquid outlet line from said mixing chamber;

said means exerting a vacuum comprising a pump in said liquid outlet line;

said liquid inlet line having a discharge opening entering said mixing chamber above said liquid outlet line in a generally tangential direction to the inner peripheral surface of said mixing chamber to provide a vortex in which said dry particulate material is dispensed upon energizing of said pump.

21. Apparatus as set forth in claim 20 wherein:

a valve member is positioned within said lower discharge opening for controlling the flow of dry particulate material from said bag; and means are provided to selectively move said valve member between open and closed positions for providing a desired amount of dry particulate material to the mixing chamber.

22. Apparatus as set forth in claim 21 wherein:

a second mixing chamber is provided in said liquid outlet line downstream of said first mentioned mixing chamber for effecting additional mixing of the liquid and particulate material, said second mixing chamber including a plurality of coils.

23. A method for dispensing a predetermined amount of dry particulate material within a mixing chamber containing liquid and for injecting the mixed liquid and dry particulate material into a pressurized supply line for delivery to a desired facility; said method comprising the following steps:

provviding a mixing chamber for mixing of liquid and the dry particulate material including a container support over the mixing chamber;

providing material supply means for the dry particulate material supported on said container support;

providing liquid to said mixing chamber for forming a fluid vortex within said mixing chamber;

dispensing dry particulate material from said material supply means into said fluid vortex for mixing of said dry particulate material with said liquid; and exerting a vacuum within said mixing chamber to minimize any migration of moisture into the dry particulate material of said material supply means while the dry particulate material is being dispensed within said mixing chamber.

24. A method for dispensing a predetermined amount of dry particulate material within a mixing chamber as set forth in claim 23 including the steps of:

providing a rigid container and flexible bag within said container to define removable material supply means for storage of said dry particulate material when not installed on said container support; and sealing said flexible bag to said rigid container to provide an air tight seal about the periphery of said flexible bag.

25. A method for dispensing a predetermined amount of dry particulate material within a mixing chamber as set forth in claim 23 including the steps of:

providing a hopper for said material supply means including a removable lid over the hopper;

placing bulk dry particulate material within said hopper upon removal of said lid;

placing a flexible cover over said dry particulate material within said hopper; and sealing said flexible cover in an air tight relation between said lid and said hopper so that said flexible cover is responsive to the vacuum within said mixing chamber and follows the upper contour of said particulate material as the particulate material is being dispensed into the mixing chamber.

* * * * *